United States Patent
Wu

(10) Patent No.: US 12,313,155 B2
(45) Date of Patent: May 27, 2025

(54) GEAR UNIT INCLUDING A HOUSING HAVING A LOWER PART AND A COVER PART

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 181 days.

(21) Appl. No.: 18/013,989

(22) PCT Filed: Jun. 9, 2021

(86) PCT No.: PCT/EP2021/025202
§ 371 (c)(1),
(2) Date: Dec. 30, 2022

(87) PCT Pub. No.: WO2022/002431
PCT Pub. Date: Jan. 6, 2022

(65) Prior Publication Data
US 2023/0287971 A1 Sep. 14, 2023

(30) Foreign Application Priority Data

Jul. 1, 2020 (CN) .......................... 202010619038.2
Jul. 22, 2020 (CN) .......................... 102020004406.9

(51) Int. Cl.
*F16H 57/021* (2012.01)
*F16H 57/023* (2012.01)
(Continued)

(52) U.S. Cl.
CPC .......... *F16H 57/021* (2013.01); *F16H 57/023* (2013.01); *F16H 57/03* (2013.01);
(Continued)

(58) Field of Classification Search
CPC .... F16H 57/03; F16H 57/031; F16H 57/0452; F16H 57/0453; F16H 57/0454; F16H 2057/216; F16H 2057/0213
See application file for complete search history.

(56) References Cited

U.S. PATENT DOCUMENTS 3,214,989 A 11/1965 Wallauer et al.
4,270,410 A 6/1981 Herscovici
(Continued)

FOREIGN PATENT DOCUMENTS

CN 202575806 U 12/2012
DE 1450724 A1 2/1969
(Continued)

OTHER PUBLICATIONS

USPTO Machine Translation (retrieved from FIT database) of the Description of WO 2011091888 A1, Herp et al., Aug. 4, 2011. (Year: 2025).*

(Continued)

*Primary Examiner* — Daniel D Yabut
(74) *Attorney, Agent, or Firm* — Carter, DeLuca & Farrell LLP

(57) ABSTRACT

A gear unit includes a housing having a lower part and a cover part, e.g., fitted onto the lower part, and an output shaft and a driving shaft. The lower part includes a first support, a second support, a base plate, and side walls. Each side wall is connected, e.g., welded, the first and second supports. The first support is a closed annular structure, e.g., a closed ring. The second support is an open annular structure, e.g., an open ring. A first bearing, e.g., a double bearing, for rotatably supporting the output shaft is received in the base plate. A second bearing for rotatably supporting the output shaft is (Continued)

received in the bearing receiving part. The base plate is connected, e.g., welded, to the second support and to the bearing receiving part.

21 Claims, 5 Drawing Sheets

(51) Int. Cl.
*F16H 57/03* (2012.01)
*F16H 57/031* (2012.01)
*F16H 57/04* (2010.01)

(52) U.S. Cl.
CPC ....... *F16H 57/031* (2013.01); *F16H 57/0452* (2013.01); *F16H 57/0408* (2013.01); *F16H 57/0416* (2013.01); *F16H 57/0424* (2013.01)

(56) References Cited

U.S. PATENT DOCUMENTS

| | | | |
|---|---|---|---|
| 9,784,361 B2 | 10/2017 | Wu | |
| 2006/0090591 A1* | 5/2006 | Graeve | F16H 57/032 |
| | | | 74/607 |
| 2006/0196304 A1* | 9/2006 | Konruff | F16H 57/031 |
| | | | 74/606 R |
| 2016/0017980 A1* | 1/2016 | Wu | F16H 57/031 |
| | | | 74/606 R |
| 2017/0234177 A1* | 8/2017 | Clark | F16H 57/0452 |
| | | | 123/195 A |
| 2021/0199190 A1* | 7/2021 | Li | F16H 57/021 |

FOREIGN PATENT DOCUMENTS

| | | | | |
|---|---|---|---|---|
| DE | 102013000518 A1 | 7/2014 | | |
| DE | 112017006668 T5 | 10/2019 | | |
| EP | 1591633 A2 * | 11/2005 | | F01M 11/0004 |
| WO | WO-2011091888 A1 * | 8/2011 | | F16C 27/066 |
| WO | 2017024646 A1 | 2/2017 | | |

OTHER PUBLICATIONS

International Report on Patentability issued in corresponding International Application No. PCT/EP2021/025202 dated Dec. 13, 2022, pp. 1-9, English Translation.

International Search Report issued in corresponding International Application No. PCT/EP2021/025202 dated Aug. 3, 2021, pp. 1-2, English Translation.

\* cited by examiner

GEAR UNIT INCLUDING A HOUSING HAVING A LOWER PART AND A COVER PART

FIELD OF THE INVENTION

The present invention relates to a gear unit with housing, having a lower part and a cover part.

BACKGROUND INFORMATION

A gear unit having a split housing, that is, having a housing that can be produced by fitting a cover part onto a lower part, is described in German Patent Document No. 10 2013 000 518.

A bearing arrangement of a gear unit is described in PCT Patent Document No. WO 2017/024646.

A gear unit having a housing is described in Chinese Patent Document No. 202575806.

A vertically arranged reduction gear unit is described in German Patent Document No. 14 50 724.

A gear unit having a high speed shaft is described in U.S. Pat. No. 4,270,410.

SUMMARY

Example embodiments of the present invention provide a gear unit that is as small as possible with pre-specified output or the same output.

According to example embodiments of the present invention, a gear unit has a housing that has a lower part and a cover part, e.g., a cover part fitted onto the lower part, and an output shaft and a driving shaft. The lower part includes a first support, a second support, a base plate, a bearing receiving part, and side walls, and each of the side walls is connected, e.g., welded, to the first support and to the second support. The first support is arranged as a closed annular structure, e.g., a closed ring, and the second support is arranged an open annular structure, e.g., an open ring. A first bearing, e.g., a double bearing, for rotatably supporting the output shaft is received in the base plate, and a second bearing for rotatably supporting the output shaft is received in the bearing receiving part. The base plate is connected, e.g., welded, to the second support, and the base plate is connected, e.g., welded, to the bearing receiving part.

Thus, a gear unit can be as small as possible for a given output. This is because the stiffening by the first and second support allows a high torque to be transmitted, although the housing can be arranged compactly.

The bearing of the output shaft is arranged both in the cover part and in the lower part. In addition, the second bearing is provided and can be arranged as an axial bearing. Thus, an axial force introduced on the load side can be diverted through the second bearing via the load receiving part to the second support and from there via the foot plates to a floor of a system within which the gear unit is installed. In this manner, therefore, the radial bearing can be carried out via the first bearing and the further bearing received in the cover part.

According to example embodiments, the first support is spaced apart from the second support. Thus, the interposed side walls can be stiffened with ribs such that the first support is rigidly connected to the second support and thus a stable housing can be provided. In addition, the axial force introduced can be diverted to the second support via the load receiving part and the second bearing.

According to example embodiments, foot plates are connected, e.g., welded, to the side of the second support facing away from the first support. Thus, the axial force can be forwarded to the floor of the system via the foot plates.

According to example embodiments, the distance between the opening of the open annular structure and the driving shaft is smaller than the distance between the opening and the output shaft. Thus, there is reduced rigidity in the region of the driving shaft, e.g., in the region of the bearing of the driving shaft received in the lower region, so that this region of the gear unit can be less loaded with transverse forces of the driving shaft. However, since a centering collar is provided for connecting the gear unit to an electric motor, the electric motor can be precisely connected and thus the introduction of transverse forces can be avoided.

According to example embodiments, the first support is O-shaped and the second support is U-shaped. Thus, the cover part can be fitted on the first support and tightly connected thereto, e.g., by a flat seal placed on the first support.

According to example embodiments, the first support and the second support are each flat, and, for example, the plane containing the first support is oriented parallel to the plane containing the second support. Thus, the side walls extend substantially perpendicular to the two planes.

According to example embodiments, one or more ribs are connected, e.g., welded, to each side wall, e.g., to the outside of each side wall, and each rib is connected, e.g., welded, both to the first support and to the second support. Thus, increased rigidity can be achieved.

According to example embodiments, the greatest distance from the rib to the specific side wall increases monotonically, e.g., highly monotonically, as the distance to the first support increases and the distance to the second support decreases. Thus, the forces transmitted via the ribs to the second support can be spread out, so that only a slight pressure is exerted on the second support.

According to example embodiments, a viewing window is arranged in a recess of at least one of the side walls. Thus, the oil level can be observed and in addition the force density transmitted through the side walls is low so that a recess for a viewing window can be provided in the side wall.

According to example embodiments, the cover part is connected to the first support. For example, the first support is continuous, e.g., has no opening, and the cover part is placed on the connecting plane provided by the first support by an edge region of the cover part projecting radially on the cover part with respect to the rotational axis of the output shaft. Thus, the first support can be widened and can form a support surface for the cover part.

According to example embodiments, a further bearing for rotatably mounting the output shaft is received in the cover part. Thus, production is readily achieved. This is because during production first the cover part is not yet fitted onto the lower part and thus the shaft, together with the first and second bearings, can be inserted through the large opening thus present. Only then is the cover part fitted on and the further bearing for rotatably mounting the shaft is received in the cover part.

According to example embodiments, the second bearing is arranged as an axial bearing, e.g., a roller bearing, a self-aligning roller bearing, a spherical roller bearing, etc. Thus, high axial forces can be diverted into the second support. The second support has a greater wall thickness than the base plate and each side wall.

According to example embodiments, an oil pan is attached to the side of the base plate facing away from the first support. Thus, oil escaping from the second bearing can be captured. In addition, heat can be removed from oil in the pan, since the oil pan has a thin wall thickness and the oil there is calmed by the ribs welded onto the oil pan and heat dissipates via the oil pan into the environment during the resultant high dwell time.

According to example embodiments, the oil pan and base plate are arranged within the second support, e.g., within the U, within the legs of the U, etc. Thus, the oil pan is arranged in a protected manner.

According to example embodiments, two ribs are connected on the side of the base plate facing away from the cover part and are welded to the base plate and are also welded to the second support. Thus, a rigid connection can be made. Thus, the first bearing remains precisely aligned with the second bearing even under a high load.

According to example embodiments, on its bottom region facing the cover part the oil pan has welded third ribs attached, e.g., welded, to a circumferential edge region of the oil pan.

The direction of extension of the third ribs, e.g., the direction of the longest dimension of the third ribs, is arranged in a plane whose normal direction is oriented parallel to the rotational axis of the output shaft and is oriented at an angle to the plane which contains at least rotational axes of at least two shafts of the gear unit, the angle being between 10° and 80°. Thus, the oil pan is stiffened, and the oil foam is calmed and broken down with oil.

Further features and aspects of example embodiments of the present invention are explained in greater detail below with reference to the appended schematic Figures.

DETAILED DESCRIPTION

Figure 1:
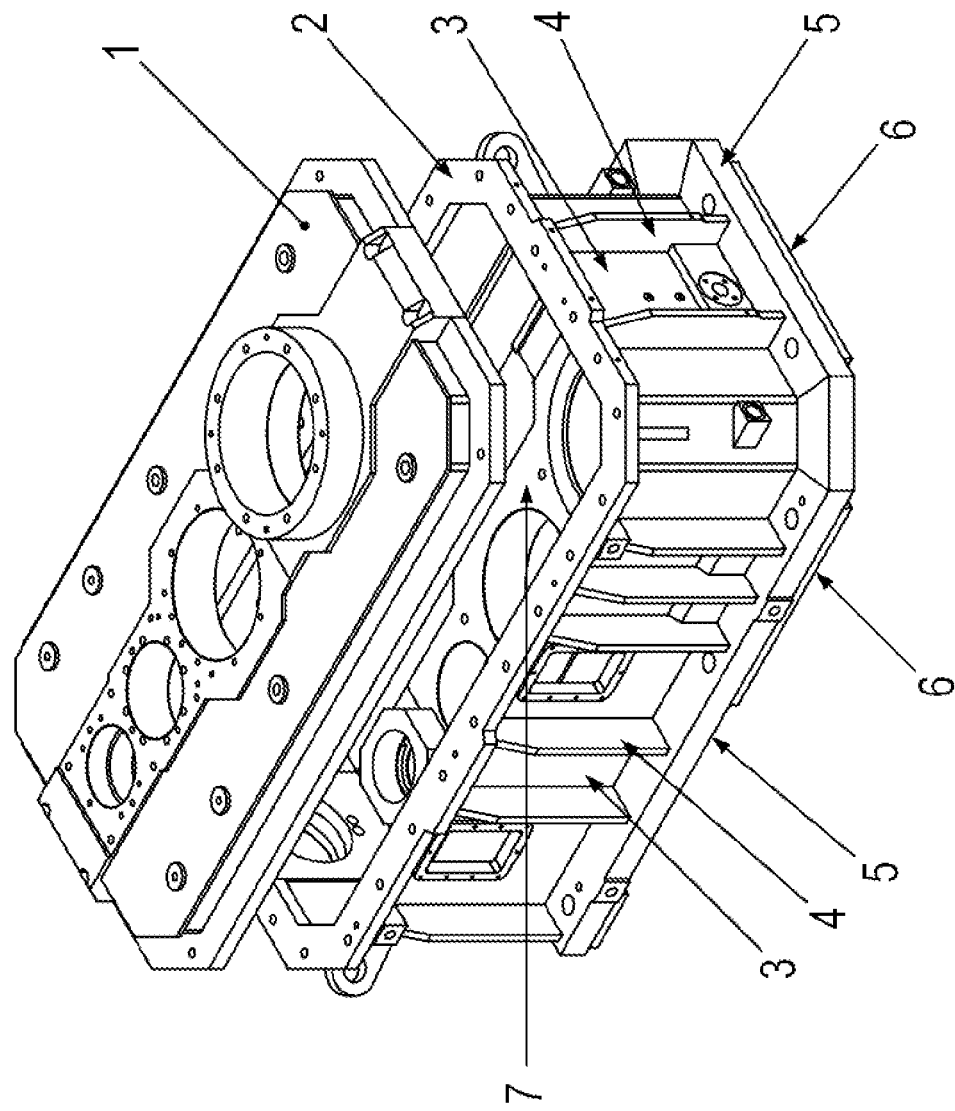
FIG. 1 is a perspective view of the housing of a gear unit having a split housing with raised cover part 1 according to an example embodiment of the present invention.
Figure 2:
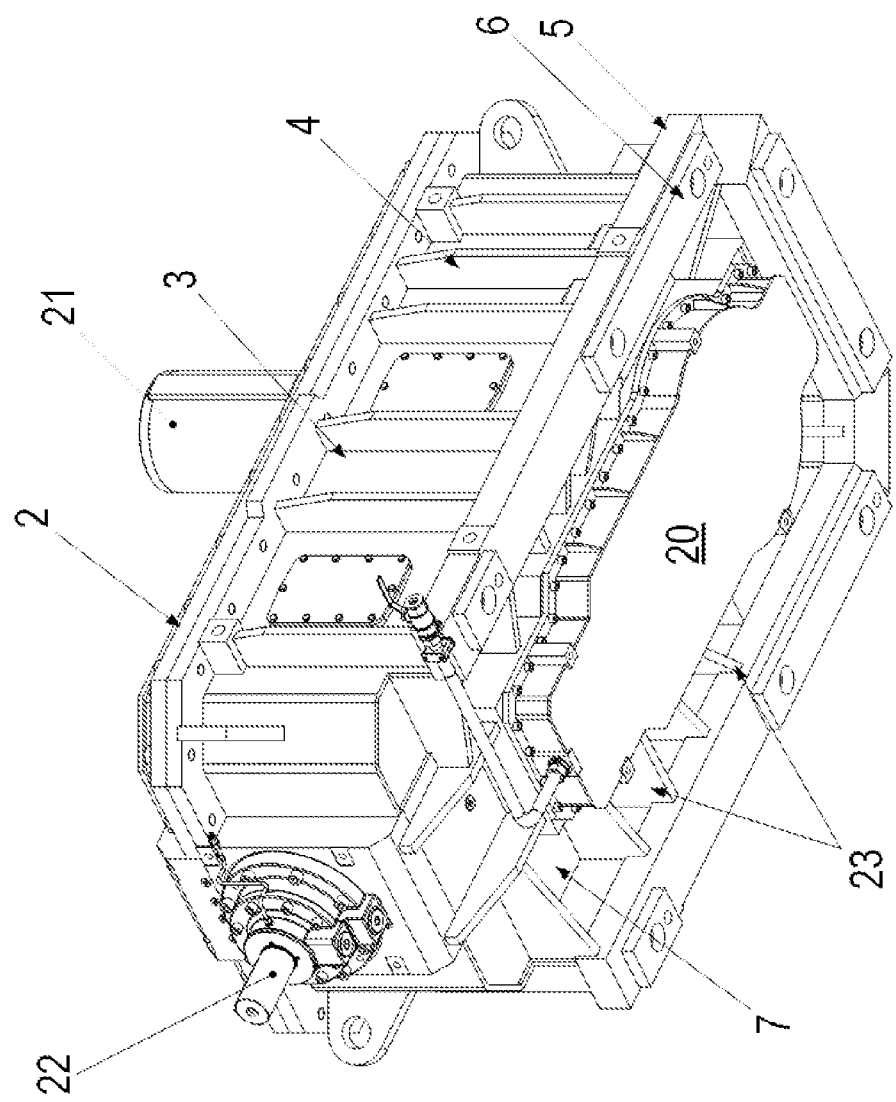
FIG. 2 is a perspective view of the gear unit from a different angle, illustrating an oil pan 20 arranged on the bottom of the lower part.
Figure 3:
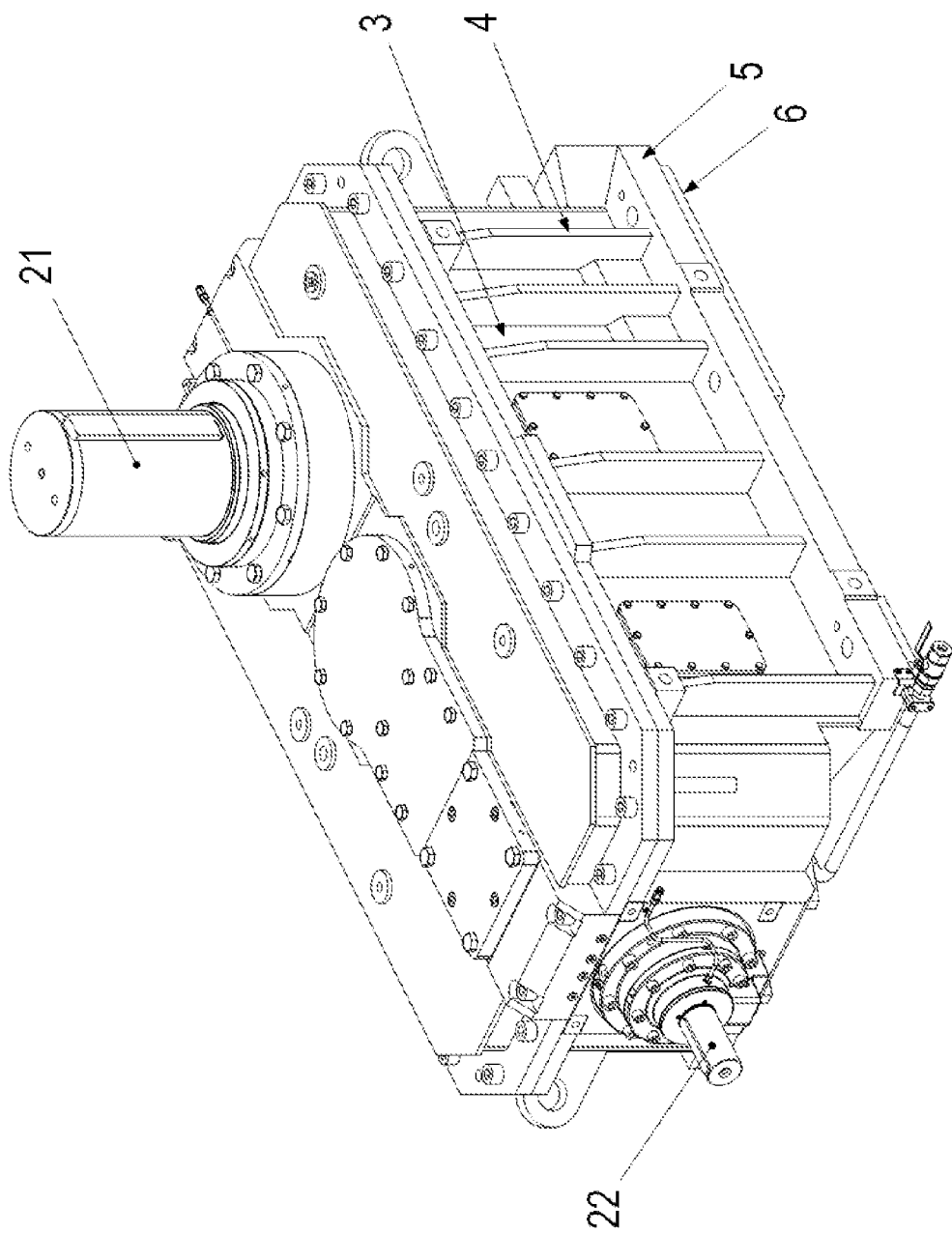
FIG. 3 is a perspective view of the gear unit from a third angle.
Figure 4:
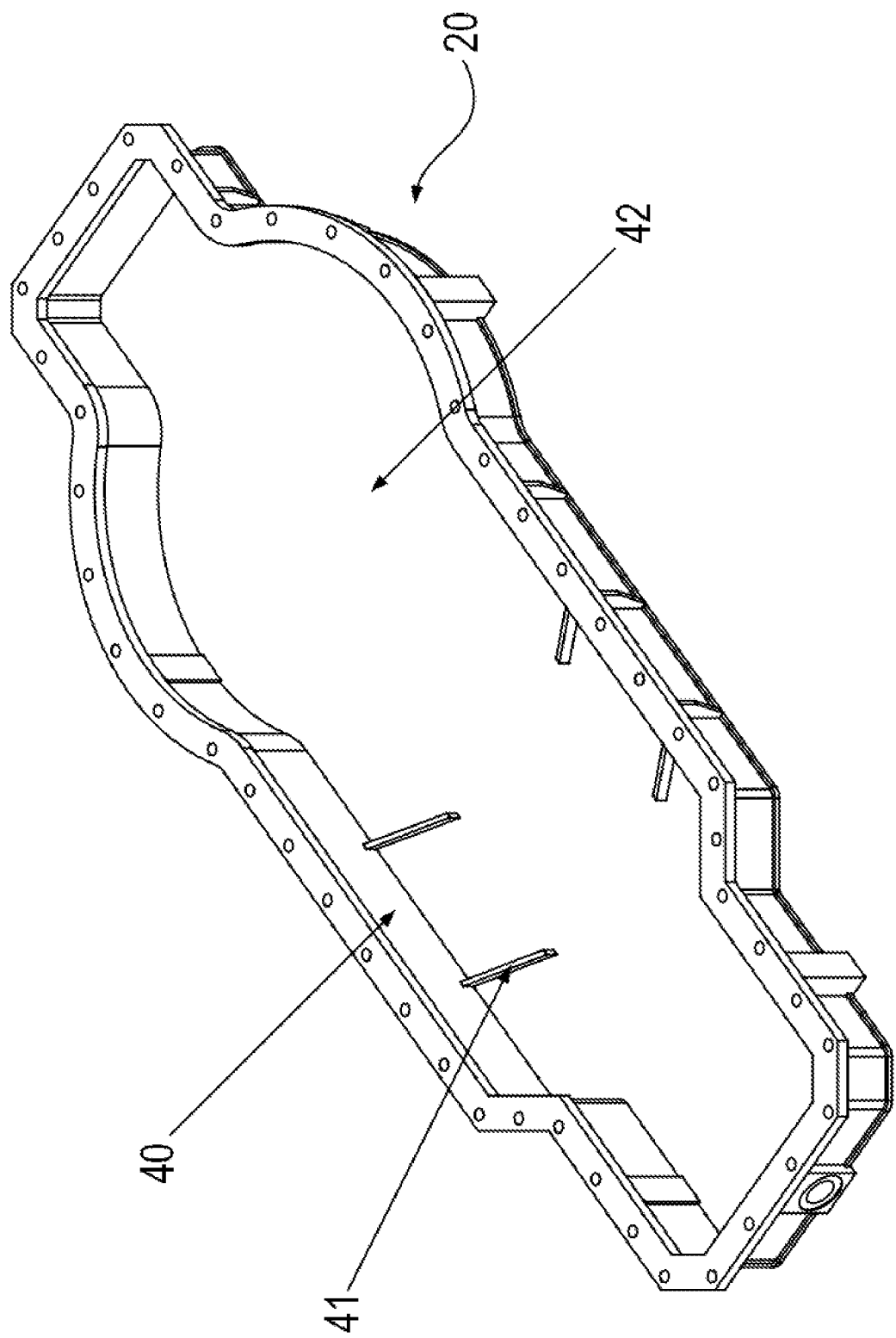
FIG. 4 is a perspective view of the oil pan 20.
Figure 5:
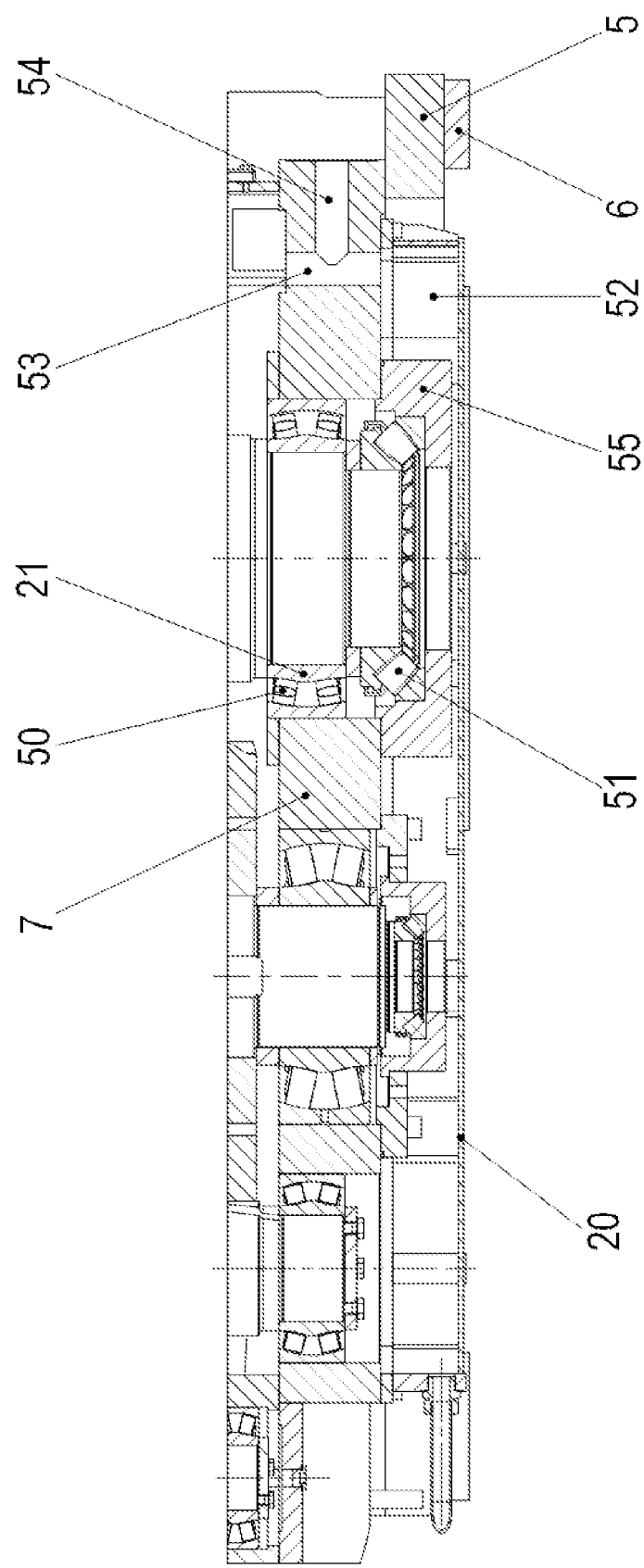
FIG. 5 is a cross-sectional view through a region of the gear unit.

As schematically illustrated in the Figures, the housing of the drive has a cover part 1 fitted axially on a lower part of the housing, e.g., parallel to the direction of the rotational axis of the shaft 21 of the gear unit.

The lower part includes a bearing seat for a first bearing 50 of the output shaft 21 and a further bearing seat for second bearing 51 of the output shaft 21. The cover part 1 also includes a bearing seat for a bearing of the driven shaft 21.

Further bearing seats for bearings of the driving shaft 22 and of at least one further shaft, e.g., an intermediate shaft, are also arranged in the lower part.

The output shaft 21 is actuated with an axial force when the gear unit is operated.

Therefore, the second bearing 51 is arranged as an angular contact bearing, e.g., a spherical roller bearing. Thus, the axial force introduced at the output shaft 21, e.g., by a driven load is diverted to the bearing receiving unit.

The bearing receiving unit is provided by a finely machined bearing seat formed on a bearing receiving part 55. The second bearing 51 is thus received in the bearing receiving part 55 that is welded to the base plate and is connected thereto on the side of the base plate 7 facing away from the cover part 1.

The first bearing 50, on the other hand, is received in the base plate 7. To this end, a bearing seat is arranged, e.g., finely machined, on the base plate 7.

The second support 5 is welded to the base plate 7 of the lower part. The gear unit is, for example, oriented such that the rotational axis of the output shaft 21 is vertical.

The second support 5 is arranged in the shape of a U. Thus, it is not completely continuous on the edge of the base plate 7. The opening in the U shape faces the driving shaft. The opening in the U shape is a shorter distance from the driving shaft 22 than from the output shaft 21.

The U shape is flat. The normal of the plane containing the U shape is oriented parallel to the rotational axis of the output shaft 21.

The second support 5 is welded to the base plate 7 and thus imparts thereto high rigidity and/or stability.

A first support 2 has an O shape, e.g., an annular shape. The normal of the plane containing the O shape is oriented parallel to the rotational axis of the output shaft 21.

The first support 2 and the second support 5 are thus each flat and oriented parallel to one another.

Side walls 3 of the lower part are connected both to the base plate 7 and to the first support 2. The base plate 7 is spaced apart from the support 2.

The first support 2 is welded to the side walls 3, the side walls 3 are welded to the second support 5, and the second support 5 is welded to the base plate 7. The lower part is formed in this manner.

The four side walls 3 each have a thinner wall thickness than the base plate 7 and the first support 2 and the second support 5.

In addition, first ribs 4 are arranged on the lower part for increasing the rigidity and stability. The first ribs 4 are, for example, configured such that each of the first ribs 4 is connected, e.g., welded, both to the first support 2 and to the second support 5 and to one of the side walls 3.

Because of this, it is possible to attain increased rigidity and in addition the first support 2 and the second support 5 project at each at the respective side wall 3 relative to the surroundings, so that each first rib 4 can be affixed on the outside of the side wall 3. The first ribs 4 are spaced apart from one another. Thus, pockets are arranged between the first ribs 4 and are limited by the first support 2, second support 5, the side wall 3, and two first ribs 4.

The foot plates 6 are connected, e.g., welded, to the side of the second support 5, e.g., the underside, facing away from the side walls 3.

The second bearing 51 received in the bearing receiving part 55 transmits the axial force added by the output shaft 21 via the bearing receiving part 55 to the base plate 7 and from there to the second support 5 and from there to the foot plates 6 arranged on the floor of a facility or on a fastening surface of a machine.

A portion of the transverse forces added to the output shaft 21 is diverted to the base plate 7 via the first bearing 50.

The opening of the U of the second support 5 is further away from the second bearing 51 than the yoke of the U connecting the two legs of the U. In this manner, the axial force is added at the most rigid location of the U.

An oil pan 20 in which the oil sump of the gear unit can be received is attached to the side of the base plate 7 facing away from the cover part. The oil pan 20 is pressed against the base plate 7 by screws, e.g., by screw heads of the screws.

Both the oil pan 20 and/or the base plate 7 are arranged inside the U, e.g., inside the legs of the U.

Each first rib 4 has a maximum distance from the side wall 3 to which it is connected, e.g., welded, which increases monotonically as the distance from the first support 2 increases. In this manner, the second support 5 is joined to the side wall 3 with improved rigidity.

The first support 2 is continuous, e.g., does not have an opening. Thus, the cover part 1, e.g., by an edge region of the cover part 1 projecting radially on the cover part 1 in relation to the rotational axis of the output shaft, is placed on the connecting plane provided by the first support 2 and is tightly connected by an interposed flat seal, in that the cover part 1 is pressed against the first support 2 by screws, e.g., screw heads thereof, screwed through the cover part 1 and into threaded holes of the first support 2.

Oil can be supplied to the oil sump arranged in the oil pan 20 from the inner space including the toothed parts by an axial bore 53 passing through the base plate 7, e.g., an axial bore 53 oriented in the direction of the rotational axis of the output shaft 21 and passing through the base plate 7. A radial bore 54 added to the base plate 7 opens into the axial bore 53 and thus allows oil to be conducted out, in which, during operation, this axial bore 53 is closed, e.g., a sealing plug.

In this manner, it is also possible to drain oil from the inner space in a simple manner during maintenance, etc.

Second ribs 23 that are welded to the base plate 7 and also welded to the second support 5 are connected to the side of the base plate 7 facing away from the cover part 1. This further increases the rigidity of the lower part.

Thus, on its side facing the cover part 1 and its side facing the oil pan 20, the second support 5 is stiffened by the first and second ribs 4, 23. Thus, the weight of an oil pan 20 filled with oil and the weight of the base plate 7 together with the forces diverted into the base plate 7 and the forces supplied via the side walls 3, can also be supplied to the second support 5 without significant deformation of the lower part occurring.

On its bottom region 42 facing the cover part 1, the oil pan 20 itself includes three ribs 41 that are welded to a circumferential edge region 40 of the oil pan. These three ribs 41 calm the oil captured in the oil pan 20. To this end, the direction of extension of the third ribs 41, e.g., the direction of the longest dimension of the third ribs 41, is arranged in a plane the normal of which is oriented parallel to the rotational axis of the output shaft and is oriented at an angle relative to the plane including at least rotational axes of at least two shafts of the gear unit, in which the angle is between 10° and 80°. The ribs 41 thus do not extend perpendicular, but rather obliquely to the plane including the rotational axes of the at least two shafts.

According to exemplary embodiments, a viewing window is arranged in a recess of the side wall 3 of the lower part.

LIST OF REFERENCE NUMERALS

1 Cover part
2 First support, e.g., circumferential annular support
3 Side wall
4 First rib
5 Second support
6 Foot plate
7 Base plate
20 Oil pan
21 Output shaft
22 Driving shaft
23 Second rib
50 First bearing
51 Second bearing
52 Space for the oil sump
53 Axial bore
54 Radial bore
55 Bearing receiving part

The invention claimed is:

1. A gear unit, comprising:
a housing including a lower part and a cover part, the lower part including a first support, a second support, a base plate, a bearing receiving part, and side walls, each side wall being connected to the first support and to the second support, the first support being arranged as a closed annular structure, the second support being arranged as an open annular structure;
an output shaft;
a driving shaft,
a first bearing adapted to rotatably support the output shaft arranged in the base plate;
a second bearing adapted to rotatably support the output shaft arranged in the bearing receiving part; and
a further bearing adapted to rotatably mount the output shaft arranged in the cover part;
wherein the base plate is connected to the second support and to the bearing receiving part;
wherein the cover part is arranged on a first side of the base plate, and the bearing receiving part is arranged on a second side of the base plate opposite the first side; and
wherein the base plate is directly connected to and in contact with the second support and to the bearing receiving part.

2. The gear unit according to claim 1, wherein the cover part is fitted onto the lower part, each side wall is welded to the first support and to the second support, the first support is arranged as a closed ring, the second support is arranged as an open ring, the first bearing is arranged as a double bearing, and the base plate is welded to the second support and to the bearing receiving part.

3. The gear unit according to claim 1, wherein the first support is spaced apart from the second support.

4. The gear unit according to claim 1, wherein foot plates are connected and/or welded to a side of the second support facing away from the first support.

5. The gear unit according to claim 1, wherein a smallest distance between an opening of the open annular structure and the driving shaft is smaller than a smallest distance between the opening and the output shaft.

6. The gear unit according to claim 1, wherein the open annular structure is flat, a distance measured in a plane of the open annular structure and/or of the second support between an opening of the open annular structure and the driving shaft is smaller than a distance measured in the plane of the open annular structure and/or of the second support between the opening and the driving shaft and a smallest distance between the opening and the output shaft.

7. The gear unit according to claim 1, wherein the first support is O-shaped and the second support is U-shaped.

8. The gear unit according to claim 1, wherein the first support and the second support are flat and/or a plane containing the first support is oriented parallel to a plane containing the second support.

9. The gear unit according to claim 1, wherein at least one rib is connected and/or welded to each side wall and/or to an outside of each side wall, and each rib is connected and/or welded to the first support and to the second support.

10. The gear unit according to claim 9, wherein greatest distance from the rib to a respective side wall increases monotonically as a distance to the first support increases and a distance to the second support decreases.

11. The gear unit according to claim 1, wherein at least one of the side walls includes a viewing window arranged in a recess of the at least one of the side walls.

12. The gear unit according to claim 1, wherein the cover part is connected to the first support.

13. The gear unit according to claim 12, wherein the first support is continuous and/or has no openings, and the cover part is arranged on a connecting plane provided by the first support by an edge region of the cover part projecting radially on the cover part with respect to a rotational axis of the output shaft.

14. The gear unit according to claim 1, wherein the second bearing is arranged as an axial bearing, a roller bearing, a self-aligning roller bearing, and/or a spherical roller bearing.

15. The gear unit according to claim 1, wherein two ribs are connected on a side of the base plate facing away from the cover part and are welded to the base plate and to the second support.

16. The gear unit according to claim 1, wherein the first and second bearings are arranged on a first axial side of the output shaft, and the further bearing is arranged a second axial side of the output shaft opposite the first axial side.

17. The gear unit according to claim 16, wherein an axial distance between the first bearing and the further bearing is smaller than an axial distance between the second bearing and the further bearing.

18. A gear unit, comprising:
a housing including a lower part and a cover part, the lower part including a first support, a second support, a base plate, a bearing receiving part, and side walls, each side wall being connected to the first support and to the second support, the first support being arranged as a closed annular structure, the second support being arranged as an open annular structure;
an output shaft;
a driving shaft,
a first bearing adapted to rotatably support the output shaft arranged in the base plate; and
a second bearing adapted to rotatably support the output shaft arranged in the bearing receiving part;
wherein the base plate is connected to the second support and to the bearing receiving part; and
wherein an oil pan is attached to a side of the base plate facing away from the first support.

19. The gear unit according to claim 18, wherein the oil pan and the base plate are arranged within the second support.

20. The gear unit according to claim 18, wherein the oil pan separates the bearing receiving part from the second support.

21. The gear unit according to claim 18, wherein on a bottom region facing the cover part, the oil pan has welded third ribs attached and/or welded to a circumferential edge region of the oil pan, an extension direction of the third ribs and/or a direction of a longest dimension of the third ribs is arranged in a plane having a normal direction oriented parallel to a rotational axis of the output shaft and oriented at an angle to a plane that contains at least rotational axes of at least two shafts of the gear unit, the angle being between 10° and 80°.

* * * * *